(12) United States Patent
Chou

(10) Patent No.: US 8,792,183 B2
(45) Date of Patent: Jul. 29, 2014

(54) ZOOM LENS

(75) Inventor: Hsiang-Ho Chou, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 44 days.

(21) Appl. No.: 13/414,169

(22) Filed: Mar. 7, 2012

(65) Prior Publication Data

US 2013/0057964 A1    Mar. 7, 2013

(30) Foreign Application Priority Data

Sep. 5, 2011   (TW) .............................. 100131906 A

(51) Int. Cl.
*G02B 15/14* (2006.01)
*G02B 13/02* (2006.01)
*G02B 15/177* (2006.01)

(52) U.S. Cl.
CPC .................................. *G02B 15/177* (2013.01)
USPC .......................................... 359/689; 359/748

(58) Field of Classification Search
USPC .................................................. 359/689, 748
See application file for complete search history.

(56) References Cited

U.S. PATENT DOCUMENTS

| | | | |
|---|---|---|---|
| 7,046,452 B2 | 5/2006 | Ori | |
| 7,212,349 B2 * | 5/2007 | Mitsuki | ......................... 359/682 |
| 7,738,183 B2 * | 6/2010 | Ito | ................. 359/689 |
| 7,817,351 B2 | 10/2010 | Luo | |
| 8,289,632 B2 * | 10/2012 | Ohata et al. | ................... 359/782 |

* cited by examiner

*Primary Examiner* — William Choi
(74) *Attorney, Agent, or Firm* — Rabin & Berdo, P.C.

(57) ABSTRACT

An embodiment of this invention provides a zoom lens that primarily comprises, in order from an object side to an image-forming side, a first lens group having negative refractive power, a second lens group having positive refractive power, and a third lens group having positive refractive power. The second lens group comprises several lenses, in which the focal length of the first lens from the object side is efl3, the focal length of the second lens from the object side is efl4, and efl3 and efl4 satisfy: 0<efl3/efl4<0.3.

20 Claims, 4 Drawing Sheets

ZOOM LENS

CROSS-REFERENCE TO RELATED APPLICATIONS

The entire contents of Taiwan Patent Application No. 100131906, filed on Sep. 5, 2011, from which this application claims priority, are incorporated herein by reference.

BACKGROUND OF THE INVENTION

1. Field of the Invention

The present invention relates to zoom lenses, especially to zoom lenses with low cost, high zoom ratio, small size, and good image quality.

2. Description of Related Art

Image-capturing devices, such as digital cameras or digital camcorders, employ a zoom lens and an image sensor to collect an image beam from an object, in which the zoom lens focuses the image beam on the image sensor, which then turns the analog signals of the image beam into digital signals for following processing, transmitting, and storage.

Typically, the zoom lens of the image-capturing devices consists of several lens groups. A zoom lens with less lens groups typically has lower cost and little dimension. In addition, plastic lenses are usually used to replace the glass lenses for further reducing the weight and cost. The plastic lenses, however, are sensitive to temperature. For compensating the temperature effect during the zooming, the displacements of the plastic lenses are typically larger than the glass lenses. The dimension of the zoom lens is therefore inevitably increased. Further, if too many plastic lenses are employed in a zoom lens, the image quality is usually unsatisfactory.

Therefore, it would be advantageous to provide novel zoom lenses having advantages of low cost and compact size as well as good image quality.

SUMMARY OF THE INVENTION

An object of the present invention is to provide novel zoom lenses having advantages of compact size, high zoom ratio, and good image quality under a low cost condition.

An embodiment of this invention provides a zoom lens that comprises, in order from an object side to an image-forming side, a first lens group having negative refractive power, a second lens group having positive refractive power, and a third lens group having positive refractive power. The second lens group comprises several lenses, in which the focal length of the first lens from the object side is efl3, the focal length of the second lens from the object side is efl4, and efl3 and efl4 satisfy: $0 < efl3/efl4 < 0.3$.

By the features described above, the zoom lenses of this invention have advantages of low cost and compact size as well as good image quality comparable to those constructed by glass lenses.

DESCRIPTION OF THE PREFERRED EMBODIMENT

Figure 1:
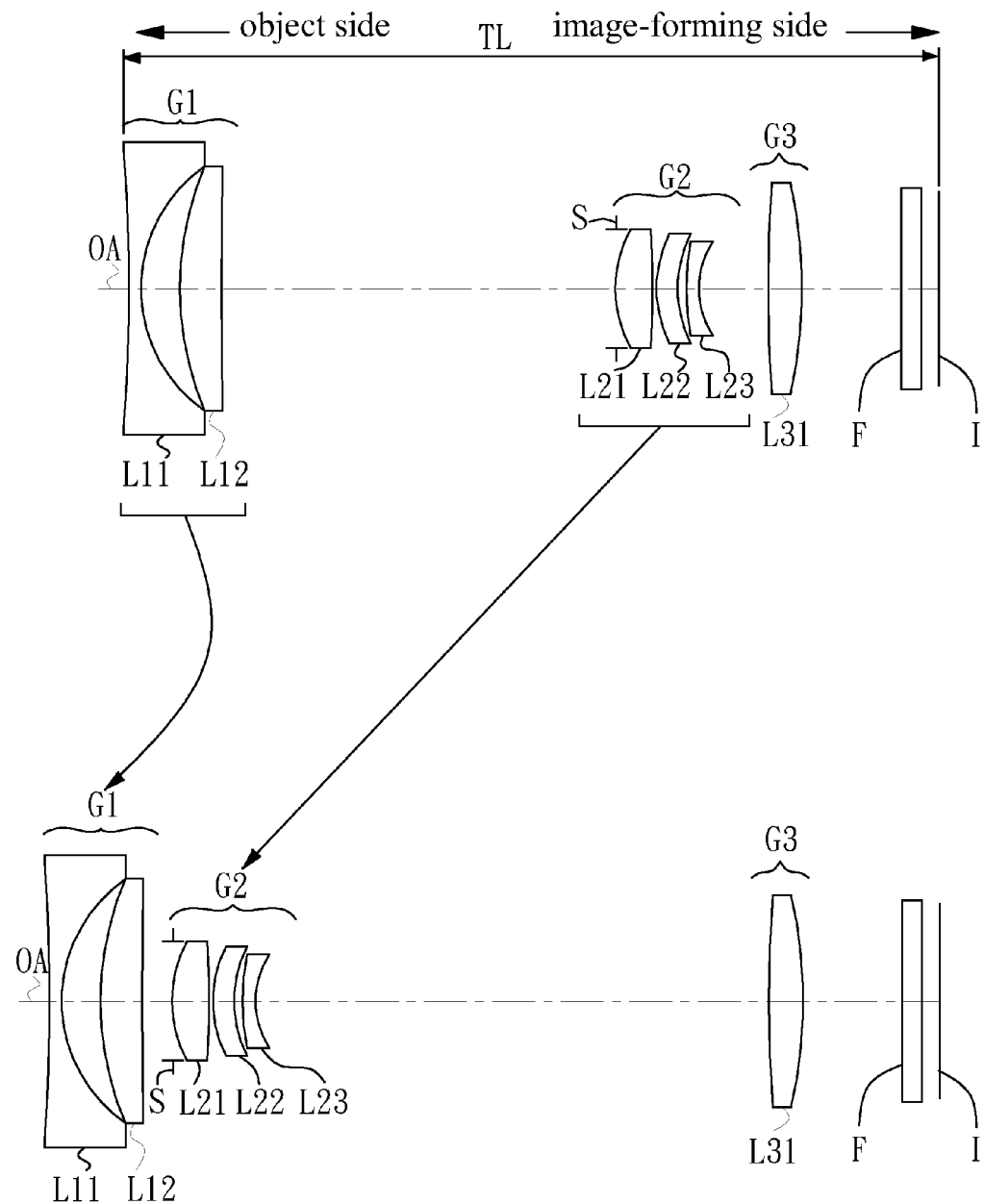
FIG. 1 shows a zoom lens ZL at the wide-angle end and the telephoto end, according to a preferred embodiment of this invention.

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. While drawings are illustrated in detail, it is appreciated that the quantity of the disclosed components may be greater or less than that disclosed, except where expressly restricting the amount of the components.

The present invention generally relates to a zoom lens that can be applied in electronic devices, which may include, but are not limited to, image-capturing devices, image-projecting devices, handheld communication devices, digital cameras, digital camcorders, projectors, and the like.

Embodiments of this invention provide zoom lenses that comprise, in order from an object side to an image-forming side, a first lens group having negative refractive power, a second lens group having positive refractive power, and a third lens group having positive refractive power. Each lens group includes at least one lens, and preferably, the first lens group and the second lens group are moved, along an optical axial and with respect to each other, for determining a zoom ratio of the zoom lenses.

In addition, the second lens group comprises several lenses, in which the first lens from the object side, i.e., the lens nearest to the object side, has a focal length efl3, the second lens from the object side has a focal length efl4, and efl3 and efl4 satisfy the condition: $0 < efld3/efl4 < 0.3$. When this condition is satisfied, the sensitivity to temperature for the lenses, especially for the lenses made of plastic, can be reduced. The displacement for compensating the focal length shift due to temperature is thus reduced, and the object of compact size is achieved.

In addition, for lenses of the second lens group, preferably, the first lens from the object side, i.e., the lens nearest to the object side, has an Abbe number VD3, the second lens from the object side has an Abbe number VD4, and VD3 and VD4 satisfy the condition: $VD3 - VD4 > 6$. In another embodiment, VD3 and VD4 satisfy the condition: $VD3 - VD4 > 23$.

In addition, the zoom ratio may have a maximum value ft/fw satisfying the following condition: $4 < ft/fw < 5$, where fw denotes the focal length of the zoom lens at the wide-angle end, and ft denotes the focal length of the zoom lens at the telephoto end.

In addition, the zoom lenses may further satisfy the following condition: |fG1/fG2|>1, where fG1 denotes the focal length of the first lens group, and fG2 denotes the focal length of the second lens group.

In addition, preferably, the first lens group comprises several lenses, in which the first lens from the object side, i.e., the lens nearest to the object side, has a surface toward the object side, and the surface has a negative curvature radius, i.e., negative radius of curvature. This feature can further reduce the total length of the zoom lenses.

If necessary, all lens groups are moved along the optical axis for altering the zoom ratio (i.e., zooming) and the focal length of the zoom lens. In detail, when zooming from the wide-angle end to the telephoto end, the first lens group and the second lens group may be moved toward the object side. The first lens group may be firstly moved toward the image-forming side, and then moved toward the object side. The second lens group may be moved straightforwardly toward the object side. The third lens group may be slightly moved for adjusting the shift of the focal length of the zoom lens.

In addition, each lens group comprises at least one aspheric lens or free-form lens made of a plastic or a glass. The plastic may comprise, but is not limited to, polycarbonate, cyclic olefin copolymer (e.g. APEL), polyester resins (e.g. OKP4 or OKP4HT), and the like. A polish or a glass molding process (GMP), using an optical grade glass material, may be used to fabricate the glass lenses, and an injection molding process, using a polymer as the material, may be used to fabricate the plastic lenses. Further, at least one surface of each free-form lens is a free-form freedom surface, and at least one surface of each aspheric lens is an aspheric surface satisfying the following equation:

$$Z = \frac{CY^2}{1 + \sqrt{1-(K+1)C^2Y^2}} + A_4Y^4 + A_6Y^6 + A_8Y^8 + A_{10}Y^{10} + A_{12}Y^{12},$$

where Z is the coordinate in the optical axis direction in which direction light propagates as positive, $A_4, A_6, A_8, A_{10}$, and $A_{12}$ are aspheric coefficients, K is coefficient of quadratic surface, R is the radius of curvature, C is reciprocal of R (C=1/R), Y is the coordinate in a direction perpendicular to the optical axis in which the upward direction is positive, and coefficients of the above equation of each aspheric lens are predetermined to determine the focal length.

A preferred embodiment is illustrated as follows.

FIG. 1 shows a zoom lens ZL at the wide-angle end and at the telephoto end, according to a preferred embodiment of this invention. In this embodiment, the zoom lens ZL primarily comprises, in order from an object side to an image-forming side, a first lens group G1 having negative refractive power, a second lens group G2 having positive refractive power, and a third lens group G3 having positive refractive power. The three lens groups are arranged along an optical axis OA, and an image-forming surface I is arranged at the image-forming side. Further, the zoom lens ZL may further comprise a stop S and a filter F. The stop S may be arranged between the first lens group G1 and the second lens group G2, for limiting the light flux of the image beam into the second lens group G2. The filter F may be arranged between the third lens group G3 and the image-forming surface I, for filtering invisible light off the image beam. The filter F may be an infrared light filter. The image-forming surface I denotes an image-capturing component, for receiving image beam passing through the filter F and converting light analog signals to electrical digital signals. Furthermore, a flat lens (not shown) may be arranged between the image-forming surface I and the filter F, for protecting the image-capturing component.

In this embodiment, in order from the object side to the image-forming side, the first lens group G1 comprises a first lens L11 having negative refractive power and a second lens L12 having positive refractive power; the second lens group G2 comprises a first lens L21 having positive refractive power, a second lens L22 having positive refractive power, and a third lens L23 having negative refractive power; the third lens group G3 comprises a first lens L31 having positive refractive power. Modifications may be made to the above-mentioned structures.

Further, the second lens L12 of the first lens group G1, the second lens L22 and the third lens L23 of the second group G2, and/or the first lens L31 of the third lens group G3 may be an aspheric lens with two aspheric surfaces, a free-form lens with two free-form freedom surfaces, or a lens with one aspheric surface and one free-form freedom surface, and other lenses of the zoom lens may be glass or plastic spherical lenses with two spherical surfaces. In this embodiment, the second lens L12, the second lens L22, the third lens L23, and the first lens L31 are plastic lenses, and other lenses are glass lenses.

Table 1 lists the detail information of an example of the zoom lens ZL shown in FIG. 1. The information includes the curvature radius, the thickness, the refractive index, the Abbe number, and the focal length (also referred to as effective focal length) of lenses or every surface of lenses in the zoom lens, where the surface numbers are sequentially ordered from the object side to the image-forming side. For example, "S1" stands for the surface of the first lens L11 facing the object side, "S2" stands for the surface of the first lens L11 facing the image-forming side, "S3" stands for the surface of the second lens facing the object side, "S" stands for the stop, and so on. In this example, the second lens group G2 has a first lens L21 with a focal length 7.98 and a second lens L22 with a focal length 60, which satisfy the mentioned condition: 0<efl3/efl4<0.3. In another example, the ratio efl3/efl4 may be less than 0.145.

TABLE 1

| lens No. | Surface No. | curvature radius (mm) | thickness (mm) | refractive index | Abbe no. | focal length |
|---|---|---|---|---|---|---|
| L11 | S1 | −105.001 | 0.65 | 1.729 | 54.68 | −8.1 |
|  | S2 | 6.309 | 1.497 |  |  |  |
| L12 | S3 | 12.096 | 1.746 | 1.636 | 23.96 | 26.197 |
|  | S4 | 40.601 | D1 |  |  |  |
|  | S | ∞ | 0 |  |  |  |
| L21 | S5 | 4.800 | 1.590 | 1.497 | 81.56 | 7.98 |
|  | S6 | −20.689 | 0.1 |  |  |  |
| L22 | S7 | 4.574 | 0.960 | 1.544 | 56.11 | 60 |
|  | S8 | 4.922 | 0.2 |  |  |  |
| L23 | S09 | 5.407 | 0.6 | 1.636 | 23.96 | −12.196 |
|  | S10 | 3.060 | D2 |  |  |  |
| L31 | S11 | 150 | 1.432 | 1.544 | 56.11 | 20.899 |
|  | S12 | −9.154 | D3 |  |  |  |
| F | S13 | ∞ | 0.8 | 1.516 | 64.142 |  |
|  | S14 | ∞ | 0.8 |  |  |  |
|  | I | ∞ | 0 |  |  |  |

In Table 1, the "thickness" stands for the distance between the indicated surface and the next. For example, the thickness of the surface S1 is the distance between the surface S1 and the surface S2, and the thickness of the surface S2 is the distance between the surface S2 and the surface S3. In addition, the thickness labeled with D1, D2, or D3 indicates that the thickness is a variable depending on the wide-angle end or the telephoto end, and Table 2 lists the detail.

TABLE 2

| thickness | Wide-angle end (mm) | Telephoto end (mm) |
|---|---|---|
| D1 | 16 | 1.1 |
| D2 | 2.811 | 22.332 |
| D3 | 4.012 | 2.3 |

Additionally, Table 3 lists the focal length f, the aperture FNO (F number), the half angle view ω, the image height Y, and the total length TL of the zoom lens listed in Table 1.

TABLE 3

| Parameters | Wide-angle end | Telephoto end |
|---|---|---|
| F (mm) | 4.67 | 22.65 |
| FNO | 3.5 | 6.6 |
| ω (°) | 43.64 | 10.13 |
| Y (mm) | 3.5 | 3.875 |
| TL (mm) | 33.2 | 42.2 |

Furthermore, in the example of Table 1, the surfaces S3, S4, S7, S8, S9, S10, S11, and S12 are aspheric surfaces. The aspheric coefficients of the aspheric surfaces are listed in Table 4.

TABLE 4

| | K | $A_4$ | $A_6$ | $A_8$ | $A_{10}$ | $A_{12}$ |
|---|---|---|---|---|---|---|
| S3 | 0 | −0.00041 | −2.13E−05 | 2.84E−06 | −5.69E−08 | 0 |
| S4 | 0 | −0.00079 | −6.62□−06 | 2.18E−06 | −5.90E−08 | 0 |
| S7 | 0 | −0.00166 | −9.60E−05 | −7.06E−06 | 7.36E−07 | 0 |
| S8 | 0 | −0.00384 | 1.32E−03 | −2.25E−04 | 1.67E−05 | 0 |
| S09 | 0 | −0.00587 | 1.74E−03 | −3.16E−04 | 1.86E−05 | 0 |
| S10 | 0 | −0.00369 | 6.50E−04 | −1.90E−04 | 5.53E−06 | 0 |
| S11 | 0 | −2.29E−05 | 1.38E−05 | 1.01E−06 | −1.73E−08 | 0 |
| S12 | 0 | 0.000249 | −1.18E−05 | 2.45E−06 | −4.46E−08 | 0 |

Figures 2A, 2B:
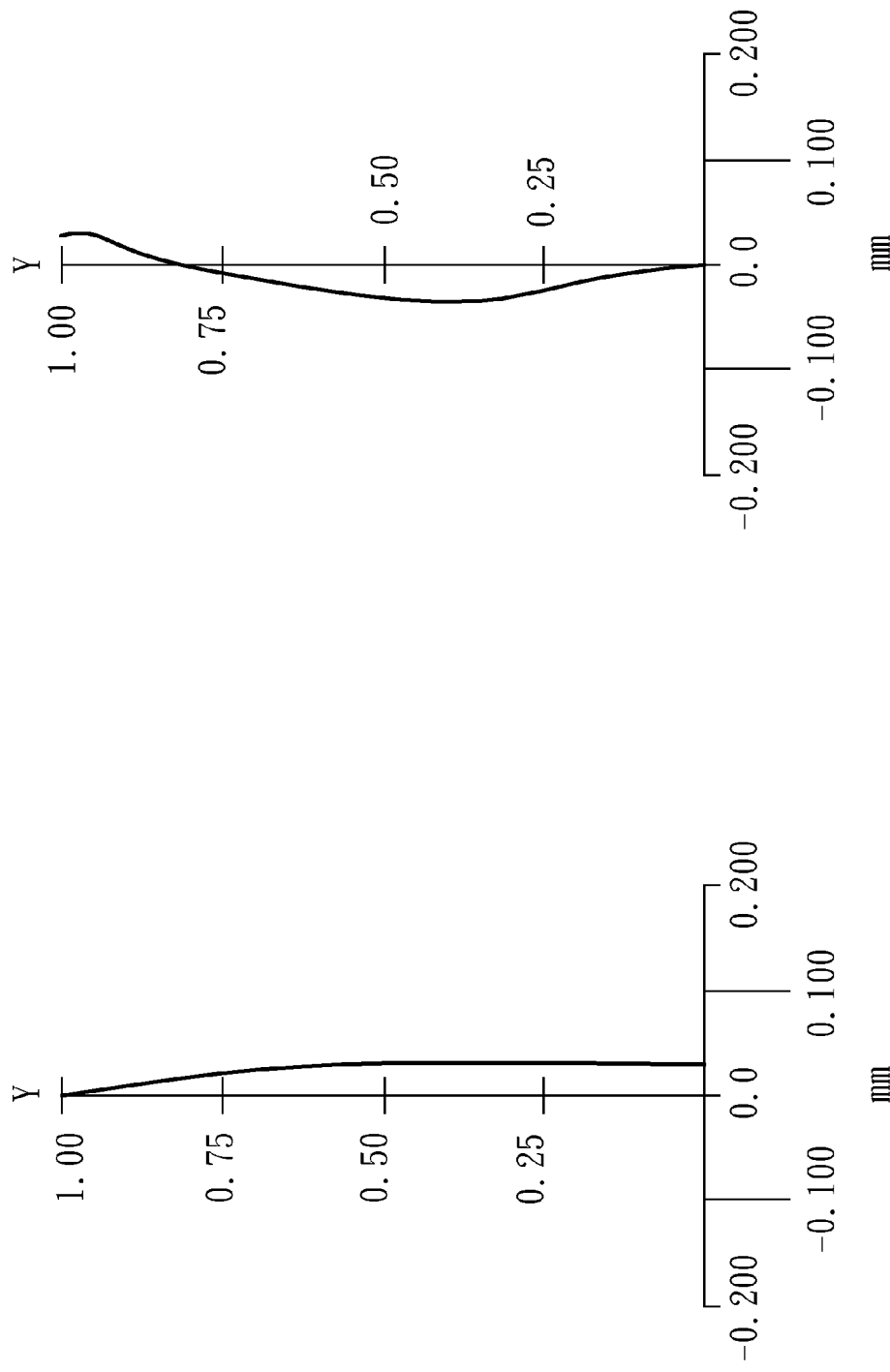
FIGS. 2A and 2B respectively show the longitudinal spherical aberration chart of the zoom lens at the wide-angle end and the telephoto end, according to an example of the preferred embodiment.

FIGS. 2A and 2B show the longitudinal spherical aberration charts of the zoom lens shown in Table 1, at the wide-angle end and the telephoto end respectively. The longitudinal spherical aberration charts are measured by an image beam with wavelength 587 nm. The charts show that the spherical aberrations are less than 0.03 mm at the wide-angle end, and within the range of −0.035 mm to 0.03 mm at the telephoto end.

Figure 3B:
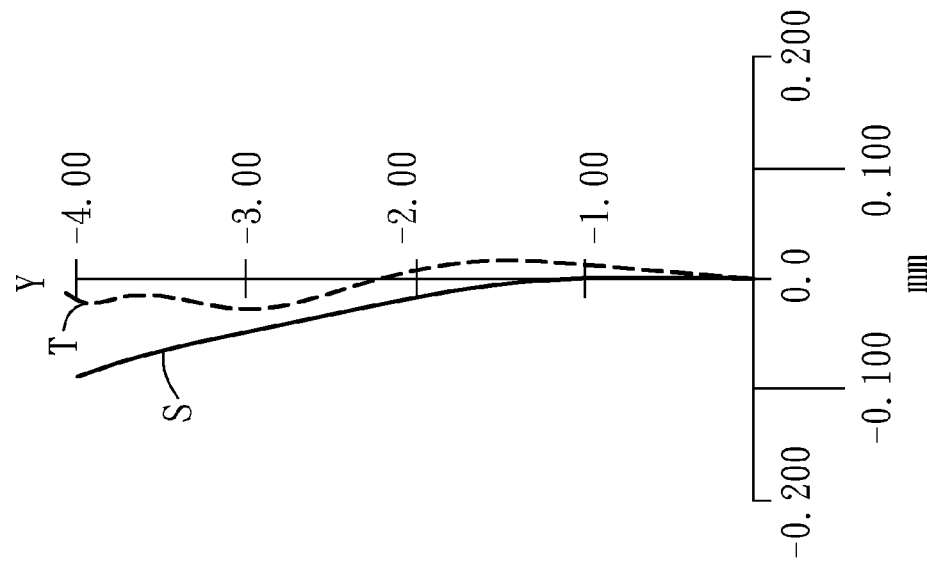
FIGS. 3A and 3B respectively show the astigmatism chart of the zoom lens at the wide-angle end and the telephoto end, according to an example of the preferred embodiment.
Figure 3A:
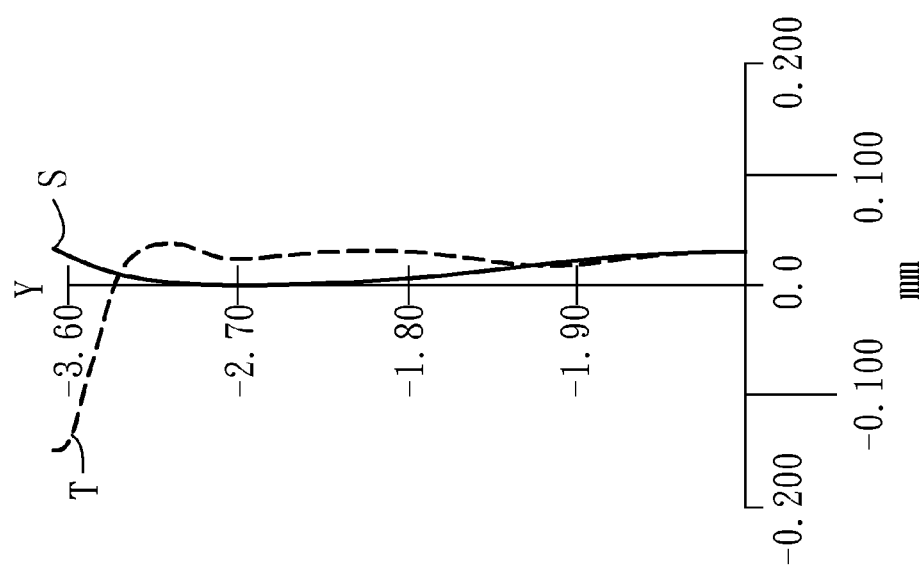

FIGS. 3A and 3B show the astigmatism charts of the zoom lens shown in Table 1, at the wide-angle end and the telephoto end respectively. The astigmatism charts are measured by an image beam with wavelength 587 nm, and curve T and S stand for the aberration of the zoom lens to the tangential rays and the sagittal rays for the image beam, respectively. The charts show that the S (i.e. tangential value) and T (i.e. sagittal value) are within the range of −0.15 mm to 0.05 mm at the wide-angle end, and within the range of −0.1 mm to 0.02 mm at the telephoto end.

Figure 4B:
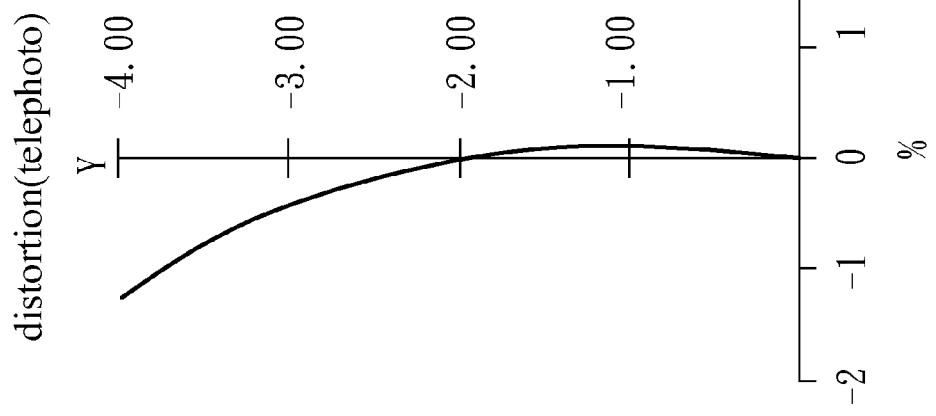
FIGS. 4A and 4B respectively show the distortion chart of the zoom lens at the wide-angle end and the telephoto end, according to an example of the preferred embodiment.
Figure 4A:
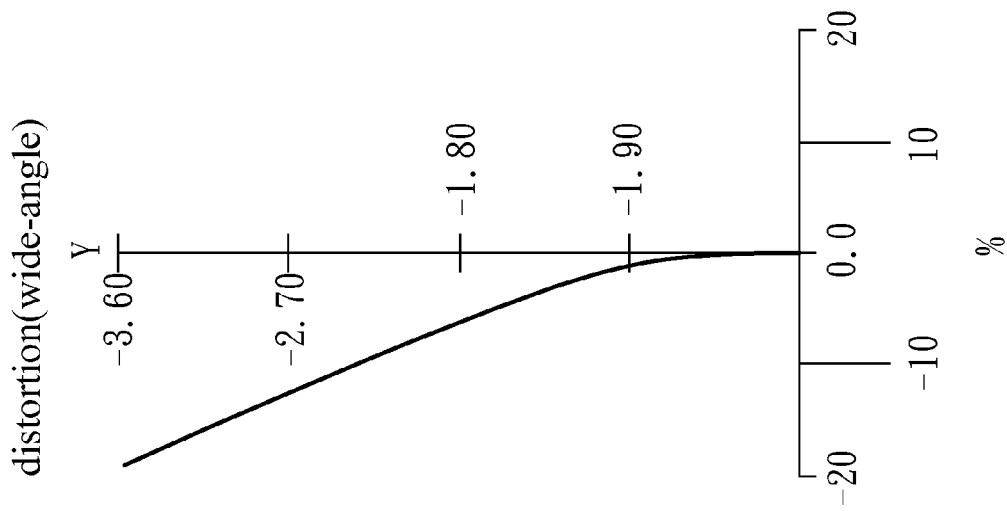

FIGS. 4A and 4B show the distortion charts of the zoom lens shown in Table 1, at the wide-angle end and the telephoto end respectively. The distortion charts are measured by an image beam with wavelength 587 nm. The charts show that all distortions are within the range of −20% to 0% at the wide-angle end, and within the range of −1.3% to 0.2% at the telephoto end.

The above example proves that even if four plastic lenses are used, this invention can provide zoom lenses with small optical aberration properties, i.e., good image quality comparable to those made of glass.

Therefore, the objective of high zoom ratio and good image quality for zoom lenses can be achieved, and the weight of the zoom lenses and thus the cost can be further reduced.

Although specific embodiments have been illustrated and described, it will be appreciated by those skilled in the art that various modifications may be made without departing from the scope of the present invention, which is intended to be limited solely by the appended claims.

What is claimed is:

1. A zoom lens, in order from an object side to an image-forming side, comprising:
    a first lens group having negative refractive power;
    a second lens group having positive refractive power and comprising at least a first lens and a second lens, wherein a focal length of the first lens is efl3, a focal length of the second lens is efl4, efl3 and efl4 satisfy the following condition: 0<efl3/efl4<0.3, the first lens is the nearer lens to the object side than the second lens, and the first lens is arranged adjacent to the second lens; and
    a third lens group having positive refractive power.

2. The zoom lens as recited in claim 1, wherein an Abbe number of the first lens of the second lens group is VD3, an Abbe number of the second lens of the second lens group is VD4, and VD3 and VD4 satisfy the following condition: VD3−VD4>6.

3. The zoom lens as recited in claim 1, wherein the zoom lens satisfies the following condition: 4<ft/fw<5, in which fw is a focal length of the zoom lens at a wide-angle end, and ft is a focal length of the zoom lens at a telephoto end.

4. The zoom lens as recited in claim 1, wherein the zoom lens satisfies the following condition: |fG1/fG2|>1, in which fG1 is a focal length of the first lens group, and fG2 is a focal length of the second lens group.

5. The zoom lens as recited in claim 1, wherein the first lens group, the second lens group, and the third lens group respectively comprise at least an aspheric lens or a free-form lens.

6. The zoom lens as recited in claim 1, wherein the first lens group, the second lens group, and the third lens group respectively comprise at least a plastic lens.

7. The zoom lens as recited in claim 6, wherein the first lens group comprises, in order from the object side to the image-forming side, a first lens having negative refractive power and a second lens having positive refractive power.

8. The zoom lens as recited in claim 7, wherein the second lens of the first lens group is an aspheric lens or a free-form lens.

9. The zoom lens as recited in claim 7, wherein the first lens of the first lens group is a glass lens, and the second lens of the first lens group is a plastic lens.

10. The zoom lens as recited in claim 7, wherein the first lens of the first lens group has a surface toward the object side, and the surface has a negative radius of curvature.

11. The zoom lens as recited in claim 6, wherein the second lens group comprises, in order from the object side to the image-forming side, the first lens having positive refractive power, the second lens having positive refractive power, and a third lens having negative refractive power.

12. The zoom lens as recited in claim 11, wherein the second lens and the third lens of the second lens group are aspheric lenses or free-form lenses.

13. The zoom lens as recited in claim 11, wherein the first lens of the second lens group is a glass lens.

14. The zoom lens as recited in claim 11, wherein the second lens and the third lens of the second lens group comprise at least a plastic lens.

15. The zoom lens as recited in claim 6, wherein the third lens group comprises a first lens having positive refractive power.

16. The zoom lens as recited in claim 15, wherein the first lens of the third lens group is an aspheric lens or a free-form lens.

17. The zoom lens as recited in claim 15, wherein the first lens of the third lens group is a plastic lens.

18. The zoom lens as recited in claim 1, further comprising a stop disposed between the first lens group and the second lens group.

19. An electronic device comprising the zoom lens claimed in claim 1.

20. A zoom lens, in order from an object side to an image-forming side, comprising:

a first lens group having negative refractive power;

a second lens group having positive refractive power and comprising at least a first lens and a second lens, wherein a focal length of the first lens is efl3, a focal length of the second lens is efl4, an Abbe number of the first lens of the second lens group is VD3, an Abbe number of the second lens of the second lens group is VD4, efl3, efl4, VD3 and VD4 satisfy the following conditions: $0<efl3/efl4<0.175$ and $VD3-VD4>6$, and the first lens is the nearer lens to the object side than the second lens; and a third lens group having positive refractive power.

* * * * *